(12) United States Patent
Huang et al.

(10) Patent No.: US 8,550,718 B2
(45) Date of Patent: Oct. 8, 2013

(54) LINEAR SLIDE TABLE

(75) Inventors: Hua-Chih Huang, Taichung (TW); Po-Chun Yaung, Taichung County (TW)

(73) Assignee: Industrial Technology Research Institute, Hsinchu (TW)

( * ) Notice: Subject to any disclaimer, the term of this patent is extended or adjusted under 35 U.S.C. 154(b) by 415 days.

(21) Appl. No.: 12/876,232

(22) Filed: Sep. 6, 2010

(65) Prior Publication Data

US 2011/0103722 A1 May 5, 2011

(30) Foreign Application Priority Data

Oct. 30, 2009 (TW) ................................ 98136898 A

(51) Int. Cl.
*F16C 32/06* (2006.01)
*F16C 17/00* (2006.01)
*F16C 29/12* (2006.01)

(52) U.S. Cl.
USPC ................... 384/12; 384/7; 384/40; 74/89.33

(58) Field of Classification Search
USPC .............. 384/12, 43–45, 40; 74/89.33, 89.34; 29/434; 254/104
See application file for complete search history.

(56) References Cited

U.S. PATENT DOCUMENTS

| 4,231,621 | A | * | 11/1980 | Teramachi ...................... 384/45 |
| 4,232,913 | A | | 11/1980 | Nilsson |
| 4,653,408 | A | | 3/1987 | Nagashima et al. |
| 4,656,951 | A | | 4/1987 | Kimura et al. |
| 4,843,706 | A | * | 7/1989 | Luther et al. ............... 29/898.07 |
| 4,957,376 | A | * | 9/1990 | Ward, Jr. ........................ 384/43 |
| 5,069,158 | A | | 12/1991 | Rey |
| 5,277,498 | A | * | 1/1994 | Kawaguchi ..................... 384/45 |
| 5,484,210 | A | * | 1/1996 | Gallone ......................... 384/49 |
| 6,654,098 | B2 | | 11/2003 | Asano et al. |
| 7,018,103 | B2 | | 3/2006 | Roeders |
| 7,287,906 | B2 | * | 10/2007 | Wasson et al. ................. 384/12 |
| 2004/0042689 | A1 | * | 3/2004 | Wasson et al. ................. 384/12 |

FOREIGN PATENT DOCUMENTS

| CN | 100363150 | 1/2008 |
| CN | 201272041 Y | 7/2009 |
| TW | 435628 | 5/2001 |
| TW | M330885 | 4/2008 |
| TW | 200821788 | 5/2008 |
| TW | M348658 | 1/2009 |
| TW | I307744 | 3/2009 |

OTHER PUBLICATIONS

"Office Action of Taiwan Counterpart Application", issued on Nov. 13, 2012, p. 1-p. 7.
"First Office Action of China Counterpart Application", issued on Dec. 7, 2011, p. 1-p. 4.

* cited by examiner

*Primary Examiner* — Alan Waits
(74) *Attorney, Agent, or Firm* — Jianq Chyun IP Office

(57) ABSTRACT

A linear slide table includes a slide rail, a loading table, at least one adjustment base, a plurality of wedges, and a plurality of adjustment elements. The loading table is disposed on the slide rail. The adjustment base is assembled below the loading table and disposed at one side of the slide rail. The wedges are disposed between the adjustment base and the loading table. The adjustment elements interconnect the wedges and the loading table for adjusting the relative positions of the wedges and the loading table, so as to adjust the distance between the adjustment base and the slide rail through the wedges pushing the adjustment base.

10 Claims, 5 Drawing Sheets

LINEAR SLIDE TABLE

CROSS-REFERENCE TO RELATED APPLICATION

This application claims the priority benefit of Taiwan patent application serial no. 98136898, filed on Oct. 30, 2009. The entirety of the above-mentioned patent application is hereby incorporated by reference herein and made a part of this specification.

TECHNICAL FIELD

The disclosure relates to a linear slide table, and more particularly, to a linear slide table which is capable of adjusting the distance between an adjustment base and a slide rail.

BACKGROUND

To meet the demands for ultra-precision positioning and micro machining systems, hydrostatic bearings with very small friction have become an indispensible key component for high precision machine tools. With the excellent stiffness, damping capacity, chattering suppression capability during cutting processes, and micron (nanometer) order high precision positioning capability, the hydrostatic bearings can provide a good solution to the bearing design for ultra-precision cutting machine tools. Therefore, the hydrostatic bearings are utilized in the bearing system of the guide rail of almost all the high-level precision machine tools around the world.

In existing linear slide tables that employ the hydrostatic bearing, pressurized lubricant oil is conveyed through a flow restrictor (or compensator) to an oil recessed chamber between a slide rail and a loading table to form a supporting oil film separating two metal contact surfaces apart thus achieving a liquid friction. The ideal value for the thickness of the initial oil film between the slide rail and the loading table can be known through theoretical analysis and calculation. The linear slide tables employing the hydrostatic bearing currently adopt two methods to achieve the ideal initial oil film thickness. One method is to employ a grinding process, i.e., according to the size of an existing slide rail, a grinding process is used to process the surface of loading table that can achieve the ideal thickness of the initial oil film. The other method is to use screw adjustment. For example, in a clearance adjustment apparatus as disclosed by Republic of China (Taiwan) patent publication no. 435628, the clearance between each bearing and the matching surface of the slide rail is individually adjusted through screws to achieve the ideal thickness of the initial oil film.

However, the fabrication cost of the linear slide table employing the grinding process is very high. In addition, if the slide rail surface experiences a frictional wear after in service for a period of time, the oil film thickness cannot be readjusted and the linear slide table must be replaced with a new one. On the other hand, in the linear slide table using the screw adjustment, the clearance between each bearing and the slide rail needs to be individually adjusted at the same time. Therefore, it is very difficult to obtain a uniform oil film thickness by adjusting all screws equally thus this may affect the overall performance and reliability of the linear slide table.

SUMMARY

Accordingly, the disclosure is directed to a linear slide table capable of reducing the cost for adjusting and improving the uniformity of the clearance between the slide rail and loading table.

One embodiment of the linear slide table includes a slide rail, a loading table, at least one adjustment base, a plurality of wedges, and a plurality of adjustment elements. The loading table is disposed on the slide rail. The adjustment base is assembled below the loading table and disposed at one side of the slide rail. The wedges are disposed between the adjustment base and the loading table. The adjustment elements interconnect the wedges and the loading table for adjusting the relative positions of the wedges and the loading table, so as to adjust the distance between the adjustment base and the slide rail through the wedges pushing the adjustment base.

In view of the foregoing, the linear slide table of the disclosure adjusts the distance between the adjustment base and the slide rail by operating the adjustment elements and wedges. Therefore, the clearance between the slide rail and the loading table can be adjusted with low cost. Further more, in comparison with the screw adjustment system, an improved uniformity of the bearing clearance of the slide table at multiple locations can be achieved by the movement of wedges.

In order to make the aforementioned and other features and advantages of the disclosure more comprehensible, embodiments accompanied with figures are described in detail below.

DESCRIPTION OF THE EMBODIMENTS

Figure 1:
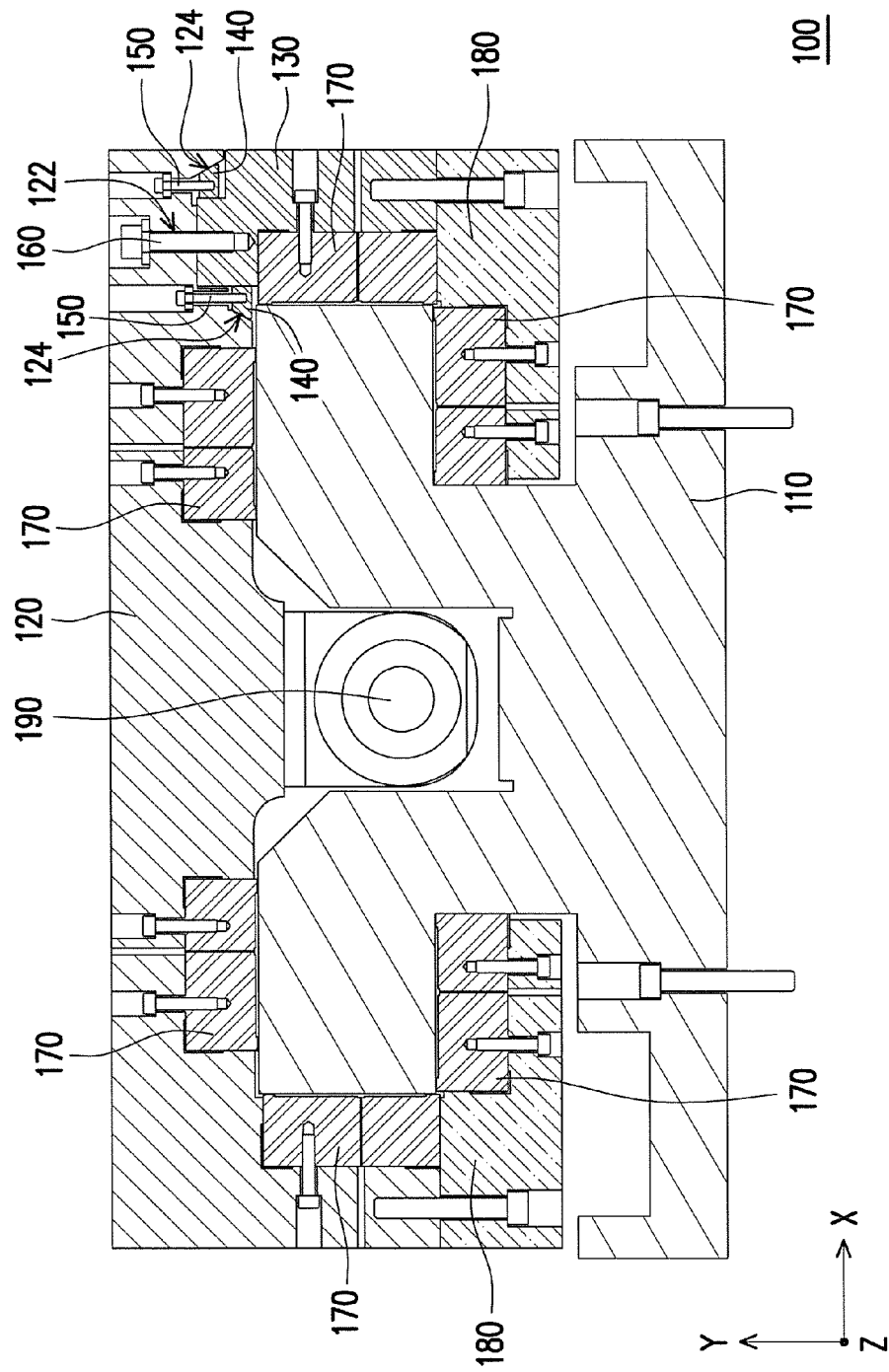
FIG. 1 is a cross-sectional view of a linear slide table according to one embodiment of the disclosure.
Figure 2:
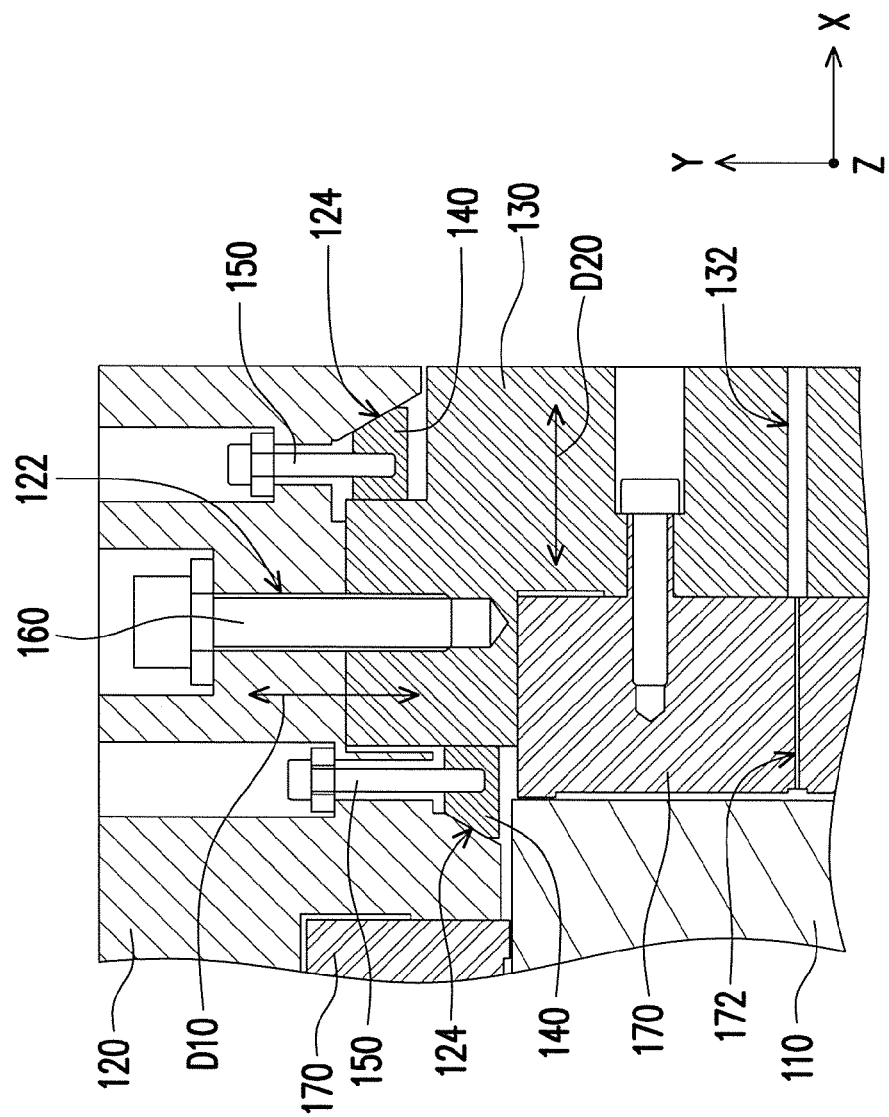
FIG. 2 is an enlarged view of a portion of the linear slide table of FIG. 1 that is adjacent the wedges.

FIG. 1 is a cross-sectional view of a linear slide table according to one embodiment of the disclosure. FIG. 2 is an enlarged view of a portion of the linear slide table of FIG. 1 that is adjacent the wedges. Referring to FIG. 1 and FIG. 2, the linear slide table 100 of the present embodiment includes a slide rail 110, a loading table 120, at least one adjustment base 130, a plurality of wedges 140, and a plurality of adjustment elements 150. The loading table 120 is disposed on the slide rail 110. The adjustment base 130 is mounted below the loading table 120 and disposed at one side of the slide rail 110. The loading table 120 is movable on the slide rail 110 in a direction parallel to Z-axis. When the adjustment base 130 is mounted below the loading table 120, the adjustment base 130 and the loading table 120 engagingly sandwich a part of the slide rail 110 therebetween so as to limit the movement of the loading stable 120 along X-axis.

The wedges 140 are disposed between the adjustment base 130 and the loading table 120. The adjustment elements 150 interconnect the wedges 140 and the loading table 120 so as to adjust the relative positions of the wedges 140 and the loading table 120. Upon a change in the relative positions of the wedges 140 and the loading table 120, the wedges 140 push the adjustment base 130 so as to adjust the distance between the adjustment base 130 and the slide rail 110.

Figure 3:
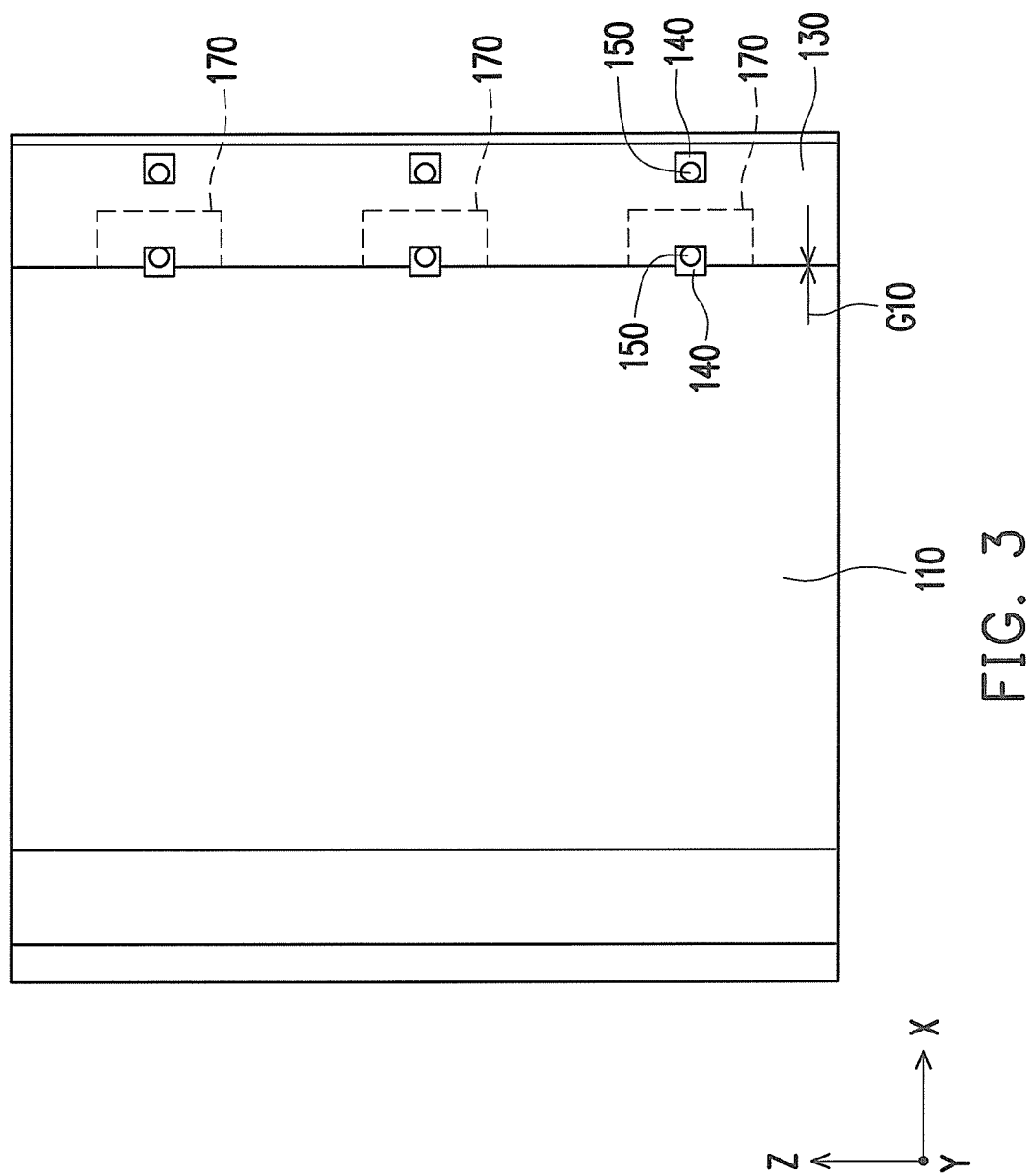
FIG. 3 is a top view of the linear slide table of FIG. 1.

FIG. 3 is a top view of the linear slide table of FIG. 1 in which the position of various elements of loading table is schematically illustrated. Referring to FIG. 2 and FIG. 3, when the left wedge 140 in FIG. 2 is moved upward on the plane defined by FIG. 2 to approach the loading table 120 under the act of the adjustment element 150, the left wedge 140 pushes the adjustment base 130 to move rightward on the plane of FIG. 2 under the influence of the reaction force of the loading table 120 exerted on the contact surface between the wedge 140 and the loading table 120, thus increasing the distance G10 between the adjustment base 130 and the slide rail 110 in FIG. 3. When the left wedge 140 in FIG. 2 is moving upward, the right wedge 140 in FIG. 2 needs to be moved downward away from the loading table 120 on the plane of FIG. 2 under the act of the adjustment element 150, so as to move the adjustment base 130 rightward on the plane of FIG. 2. On the contrary, when the left wedge 140 in FIG. 2 is moved downward away from the loading table 120 on the plane of FIG. 2, and the right wedge 140 in FIG. 2 is moved upward to approach the loading table 120 on the plane of FIG. 2, the right wedge 140 pushes the adjustment base 130 rightward on the plane of FIG. 2, thus reducing the distance G10 between the adjustment base 130 and the slide rail 110 in FIG. 3.

The adjustment element 150 of the present embodiment causes the wedge 140 to move along a first direction D10 (parallel to Y-axis), which in turn pushes the adjustment base 130 to move along a second direction D20 (parallel to the X-axis) that is perpendicular to the first direction D10. In addition, the first direction D10 is perpendicular to the movement direction (Z-axis) of the loading table 120 along the slide rail 110. Besides, the loading table 120 has a plurality of beveled surfaces 124 at an underside thereof, and the wedges 140 abut against the beveled surfaces 124. The term "beveled surface" 124 used herein is intended to mean that the normal line to the surface and the movement direction (i.e. the first direction D10) of the wedge 140 to form an acute angle therebetween. The normal line to the contact surface between the wedge 140 and the adjustment base 130 is perpendicular to the movement direction of the wedge 140. However, it can alternatively be designed such that the normal line to the contact surface between the wedge 140 and the adjustment base 130 and the movement direction of the wedge 140 to form an acute angle therebetween, while the normal line to the contact surface between the wedge 140 and the loading table 120 is perpendicular to the movement direction of the wedge 140.

By means of these operations, the distance G10 between the adjustment base 130 and the slide rail 110 can be adjusted to an ideal value. In addition, even though the distance G10 becomes larger due to frictional wear after a long period of service time of the linear slide table 100, the distance G10 can be adjusted back to the ideal value by operating the adjustment elements 150 and the wedges 140. It is no need to discard the entire linear slide table 100, thus it increases the durability and reduces the overall cost of the linear slide table 100.

In the present embodiment, the adjustment elements 150 are screws. However, this is for the purpose of description and should not be regarded as limiting. Therefore other mechanism devices to be used as adjustment elements are also possible. Each adjustment element 150 extends through the loading table 120 and is threadingly engaged with one of the wedges 140 such that rotation of the adjustment element 150 drives the wedge 140 to move upward or downward along Y-axis. In addition, the linear slide table 100 of the present embodiment further includes a screw 160 extending through the loading table 120 and threadingly engaged with the adjustment base 130. After the distance G10 is adjusted to the ideal value by operating the adjustment elements 150 and the wedges 140, the loading table 120 and the adjustment base 130 can be fastened together with the screw 160 to prevent variation of the distance G10. Furthermore, the loading table 120 has a through hole 122 allowing the screw 160 to extend therethrough and the diameter of the through hole 122 is configured to be larger than the diameter of the corresponding part of the screw 160 such that a radial clearance is provided between the load table 120 and the adjustment base 130 for relative movement therebetween.

The linear slide table 100 of the present embodiment further includes a plurality of hydrostatic plane bearings 170. At least one hydrostatic plane bearing 170 is mounted to the adjustment base 130 and disposed between the adjustment base 130 and the slide rail 110. In the present embodiment, three hydrostatic plane bearings 170 are mounted to the adjustment base 130. The other hydrostatic plane bearings 170 are mounted to the loading table 120 and disposed between the loading table 120 and the slide rail 110. The hydrostatic plane bearings 170 mounted to the adjustment base 130 are fixed relative to the adjustment base 130. As such, when the distance G10 between the adjustment base 130 and the slide rail 110 is adjusted to the ideal value by operating the adjustment elements 150 and the wedges 140, the distance between the three hydrostatic plane bearings 170 and the slide rail 110 is simultaneously adjusted to the ideal value as well. In addition, each hydrostatic plane bearing 170 has an oil supply conduit 172, the adjustment base 130 also has an oil supply conduit 132 corresponding to the oil supply conduit 172, and the loading table 120 also has a similar conduit (not shown). As such, an optimized thickness of the oil film between the adjustment base 130 and the slide rail 110 can be achieved to maximize the stiffness. Moreover, due to the inherent characteristics of the fluid, two opposite sides of the upper part of the slide rail 110 are spaced a same distance from the adjustment base 130. These oil supply conduits are fluidly connected to an external oil supply system and a flow restrictor. The external oil supply system and the flow restrictor are well known to those skilled in the art and thus not discussed further herein.

Referring to FIG. 1, the linear slide table 100 of the present embodiment further includes two retaining portions 180. The two retaining portions 180 are assembled below the adjustment base 130 and below one side of the loading table 120 that is away from the adjustment base 130, respectively. Viewed along the movement direction (Z-axis) of the loading table 120 on the slide rail 110, the loading table 120, the adjustment base 130 and the retaining portions 180 cooperatively form a C-shaped configuration that retains the upper part of the slide rail 110 therebetween. In addition, part of the hydrostatic plane bearings 170 are assembled to the retaining portions 180. Furthermore, the linear slide table 100 of the present embodiment further includes a drive shaft 190 disposed along a center of the slide rail 110 and coupled to the loading table 120 for driving the loading table 120 to move on the slide rail 110.

Figure 4:
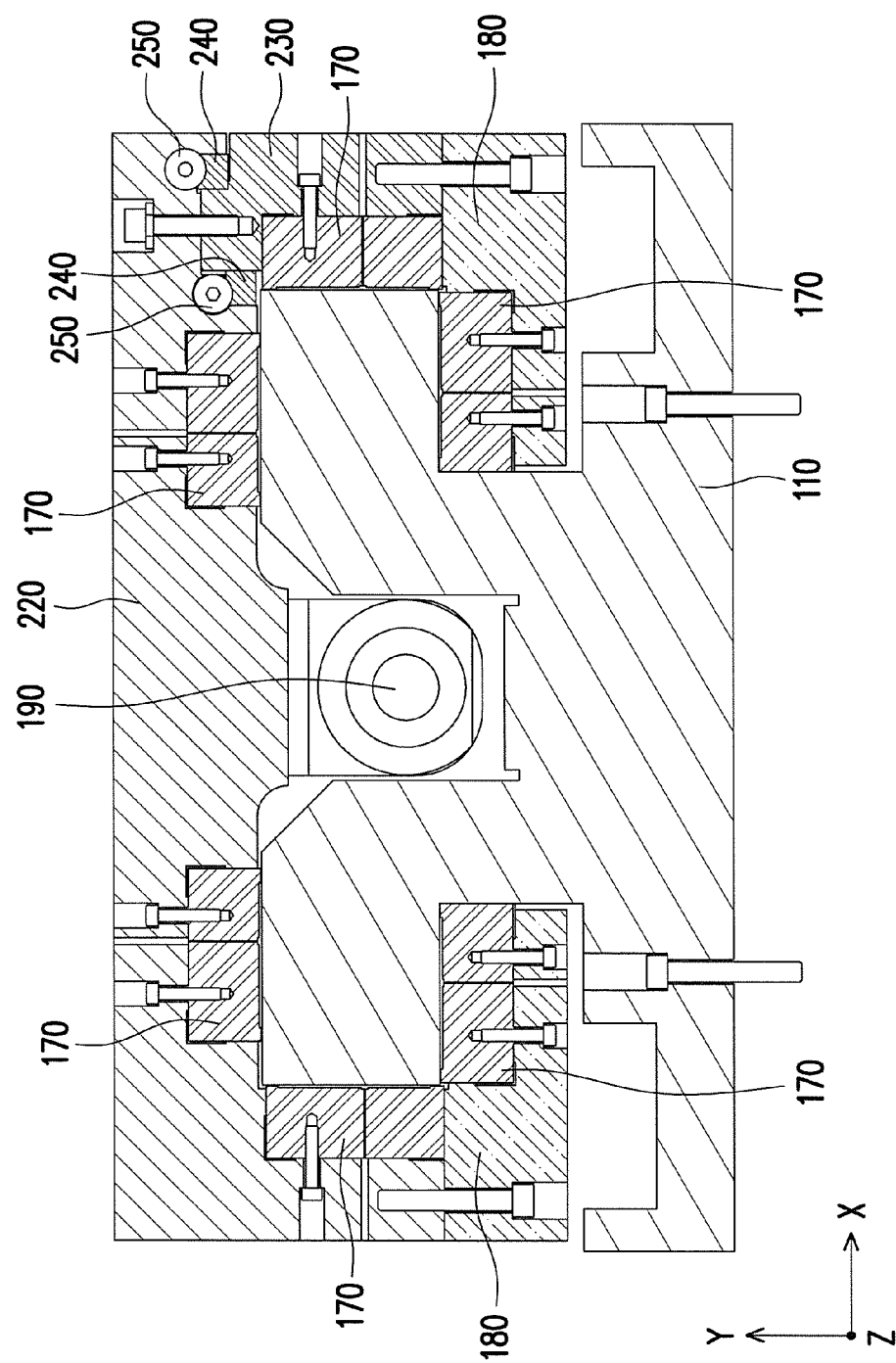
FIG. 4 is a cross-sectional view of a linear slide table according to another embodiment of the disclosure.
Figure 5:
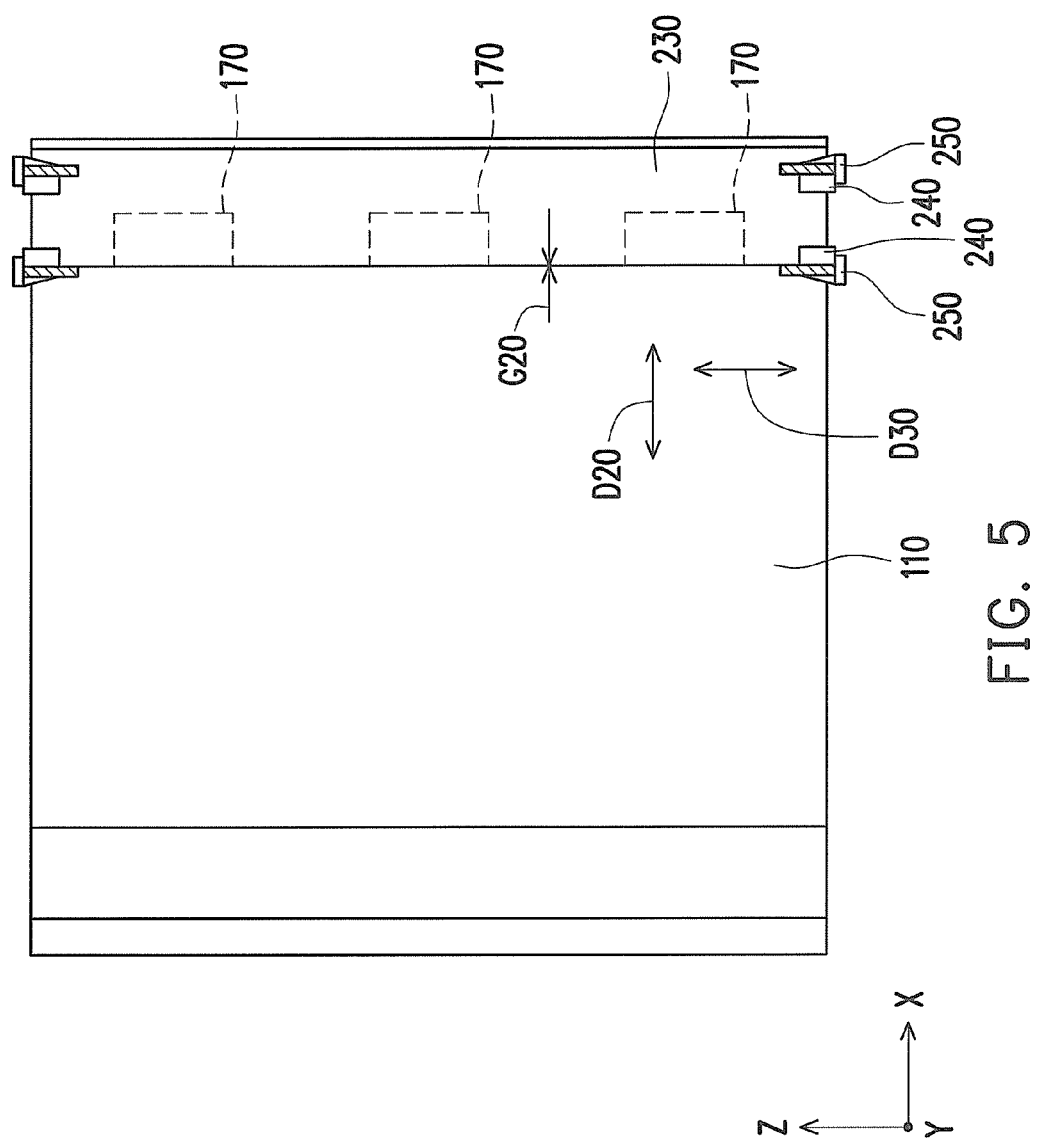
FIG. 5 is a top view of the linear slide table of FIG. 4.

FIG. 4 is a cross-sectional view of a linear slide table according to another embodiment of the disclosure. FIG. 5 is a top view of the linear slide table of FIG. 4. In FIG. 5, the position of various elements of the loading table is schematically illustrated. Referring to FIG. 4 and FIG. 5, the difference between the present embodiment and the previous embodiment is that the adjustment element 250 of the present embodiment causes the wedge 240 to move in a third direction D30 that is parallel to the movement direction (Z-axis) of the loading table 220 on the slide rail 110. When the adjustment element 250 causes the wedge 240 to move in the third direction D30, the wedge 240 pushes the adjustment base 230 in the second direction D20 (parallel to X-axis), thereby adjusting the distance G20 between the adjustment base 230 and the slide rail 110.

In summary, the linear slide table of the disclosure adjusts the distance between the adjustment base and the slide rail by operating the adjustment elements and wedges. Therefore, the clearance between the slide rail and the loading table can be adjusted with low cost without using the high cost grinding process. In addition, when the clearance becomes larger due to frictional wear, the clearance can be readjusted, thereby prolonging the lifetime of the linear slide table. Moreover, instead of individually adjusting the distance between multiple elements and the slide rail, the linear slide table of the disclosure adjusts the distance between the adjustment base and the slide rail. Therefore, the clearance has an improved uniformity.

It will be apparent to those skilled in the art that various modifications and variations can be made to the structure of the disclosure without departing from the scope or spirit of the invention. In view of the foregoing, it is intended that the disclosure cover modifications and variations of this invention provided they fall within the scope of the following claims and their equivalents.

What is claimed is:

1. A linear slide table comprising:
a slide rail;
a loading table disposed on the slide rail;
at least one adjustment base assembled below the loading table and disposed at one lateral side of the slide rail;
a plurality of wedges disposed between the adjustment base and the loading table; and
a plurality of adjustment elements located on opposite lateral sides of the at least one adjustment base, each of the plurality of adjustment elements interconnecting one of the wedges and the loading table for adjusting the relative positions of the wedges and the loading table, so as to adjust the distance between the adjustment base and the slide rail through the wedges pushing the adjustment base, wherein the loading table has a plurality of beveled surfaces corresponding to opposite lateral sides of the at least one adjustment base, and the wedges abut against the beveled surfaces.

2. The linear slide table according to claim 1, wherein each of the adjustment elements is a screw, and each screw extends through the loading table and is threadingly engaged with a corresponding one of the wedges such that rotation of the screw drives the wedge to move.

3. The linear slide table according to claim 1, further comprising at least one screw extending through the loading table and threadingly engaged with the adjustment base.

4. The linear slide table according to claim 1, further comprising a plurality of hydrostatic plane bearings, wherein at least one of the hydrostatic plane bearings is assembled to the adjustment base and disposed between the adjustment base and the slide rail, and the other hydrostatic plane bearings are assembled to the loading table and disposed between the loading table and the slide rail.

5. The linear slide table according to claim 1, wherein the adjustment elements are adapted to drive the wedges to move in a first direction which in turn pushes the adjustment base to move in a second direction, and the first direction is perpendicular to the second direction.

6. The linear slide table according to claim 5, wherein the first direction is perpendicular to a movement direction of the loading table on the slide rail.

7. The linear slide table according to claim 5, wherein the first direction is parallel to a movement direction of the loading table on the slide rail.

8. The linear slide table according to claim 1, further comprising two retaining portions, wherein the two retaining portions are assembled below the adjustment base and below one side of the loading table that is away from the adjustment base, respectively, and, viewed along a movement direction of the loading table on the slide rail, the loading table, the adjustment base and the retaining portions cooperatively form a C-shaped configuration that retains a part of the slide rail therebetween.

9. The linear slide table according to claim 1, further comprising a transmission shaft disposed along a center of the slide rail and coupled to the loading table for driving the loading table to move on the slide rail.

10. The linear slide table according to claim 1, wherein the plurality of beveled surfaces are at an underside of the loading table.

* * * * *